United States Patent
Miyako

[11] Patent Number: 5,993,102
[45] Date of Patent: Nov. 30, 1999

[54] ROTARY BODY FIXING DEVICE

[75] Inventor: Michio Miyako, Osaka-fu, Japan

[73] Assignee: Tsubakimoto Chain Co., Osaka, Japan

[21] Appl. No.: 09/050,322

[22] Filed: Mar. 30, 1998

Related U.S. Application Data

[63] Continuation-in-part of application No. 08/755,889, Dec. 2, 1996, abandoned.

[51] Int. Cl.$^6$ .................................................. F16D 1/06
[52] U.S. Cl. ...................... 403/370; 403/371; 403/347.4
[58] Field of Search ..................... 403/370, 371, 403/373, 367, 368, 369, 374.1, 374.2, 374.3, 374.4

[56] References Cited

U.S. PATENT DOCUMENTS

| | | | |
|---|---|---|---|
| 2,865,561 | 2/1958 | Muellenberg | 403/370 |
| 3,717,367 | 2/1973 | Peter et al. | 287/52 |
| 3,847,495 | 11/1974 | Peter et al. | 403/370 |
| 3,849,015 | 11/1974 | Peter et al. | 403/370 |
| 3,990,804 | 11/1976 | Peter et al. | 403/370 |
| 4,025,213 | 5/1977 | Schafer et al. | 403/370 |
| 4,095,908 | 6/1978 | Schafer et al. | 403/16 |
| 4,475,842 | 10/1984 | Onaya et al. | 403/370 |
| 4,615,640 | 10/1986 | Hosokawa | 403/369 |
| 4,781,486 | 11/1988 | Mochizuki | 403/303 |
| 5,370,472 | 12/1994 | Muellenberg | 403/370 |
| 5,709,625 | 1/1998 | Nakakubo et al. | 474/110 |

*Primary Examiner*—Harry C. Kim
*Attorney, Agent, or Firm*—Dann, Dorfman, Herrell and Skilman; Henry H. Skillman

[57] ABSTRACT

A rotary body fixing device capable of mounting and removing a rotary body on a shaft easily and rapidly. The device has inner and outer elastically deformable rings and a pair of oppositely tapered rings for wedging between the inner and outer rings in a clamping position. Extraction bolt holes 4F for threaded engagement with extraction bolts 7 are formed axially through one tapered ring 4. The extraction bolts 7 come into abutment at their tip ends against an end face of the other tapered ring 5 to move both tapered rings away from each other. In an axially medial part of the outer peripheral surface of the inner ring 2 and of the inner peripheral surface of the outer ring 3, annular grooves respectively form stepped portions on both sides of the annular groove. At or adjacent the opposite ends of the paired tapered rings, retaining flange portions engage the stepped portions when the rings are displaced outwardly a predetermined distance from the clamping position so that outward displacement of the retaining flange portions is limited by the stepped portions. Registering annular cylindrical flats are provided between the flanges and the tapered surfaces of the tapered rings, and between the grooves and the tapered surfaces of the inner and outer rings.

12 Claims, 8 Drawing Sheets

ROTARY BODY FIXING DEVICE

RELATED APPLICATION

The present invention is a continuation-in-part of application Ser. No. 08/755,889, filed Dec. 2, 1996, now abandoned.

FIELD OF THE INVENTION

The present invention relates to a rotary body fixing device for fixing a rotary body to a shaft.

BACKGROUND OF THE INVENTION

Heretofore, as a rotary body fixing device for use in detachably fixing a rotary bodes such as, for example, a pulley or a gear to a shaft, there has been known a rotary body fixing device of a structure in which opposed outer and inner peripheral surfaces of concentric inner and outer rings, respectively, are formed as a pair of tapered surfaces so that the spacing between the paired tapered surfaces is wider toward both sides from an axially central part, a pair of tapered rings are inserted into the space between both tapered surfaces axially from both sides, and both tapered rings are pulled toward each other with a large number of clamping bolts, thereby causing the inner peripheral surface of the inner ring to expand and come into pressure contact with the said shaft and causing the outer peripheral surface of the outer ring to expand and come into pressure contact with the inner peripheral surface of the boss hole formed in the rotary body, to clamp the shaft and the boss.

In the rotary body fixing device of the above structure, the angle of each tapered surface is designed to be small in order to increase the clamping force and therefore even after the clamping bolts have been loosened for removing the rotary body from the shaft, both tapered rings remain self-locked and fixed between the inner and outer rings by virtue of a frictional force.

To avoid such inconvenience, the conventional rotary body fixing device in question is usually provided with a structure for extracting the tapered rings which are firmly wedged into the space between the inner and outer rings. FIGS. 9–12 show an example of a conventional rotary body fixing device having the said structure, of which FIG. 9 is a side view thereof and FIG. 10 is a sectional view as seen in the arrowed direction 10—10 in FIG. 9.

As shown in these figures, a rotcary body fixing device 11 is provided with an elastically deformable inner ring 12 to be mounted on a shaft and an elastically deformable outer ring 13 to be fitted in a boss hole formed in the rotary body. The opposed confronting surfaces of the inner ring 12 and the outer ring 12 are formed as tapered surfaces so that the spacing between both surfaces is wider toward both outer sides from an axially central part. A pair of tapered rings 14 and 15 are inserted axially from both sides into the space formed between both such tapered surfaces. Clamping bolts 16 are inserted through clamping bolt holes 14A formed in one tapered ring 14 and are brought into engagement with tapped holes 15A formed in the other tapered ring 15 to clamp both tapered rings.

Annular grooves 12A and 13A of an equal width are formed in axially central portions of the opposed surfaces of the inner ring 12 and the outer 13, respectively, and a spacer ring 17 is held between the annular grooves 12A and 13A. Holes 17A for passing the clamping bolts 16 therethrough are formed in the spacer ring 17.

On the other hand, extraction bolt holes 14B are formed at positions opposed to clamping bolt holes 14A in the tapered ring 14 radially with respect to the axis. Part of the inner peripheral surface of each extraction bolt hole 14B is formed with internal threads.

FIG. 11 shows a manner in which one tapered ring 14 wedged into the space between the inner ring 12 and the outer ring 13 is extracted after removal of the clamping bolts 16. Extraction bolts 18 are threadedly engaged with the internal threads of the extraction bolt holes 14B and their tip ends are brought into abutment against the spacer ring 17. As the extraction bolts 18 are turned, the tapered ring 14 now engaged with the extraction bolts 18 is extracted leftwardly from between the inner ring 12 and the outer ring 13 because the advance of the extraction bolts 18 is inhibited by the spacer ring 17.

FIG. 12 is a sectional view as seen in the arrowed direction 12—12 in FIG. 9, with the tapered ring 14 removed, showing in what manner the other tapered ring 15 is extracted. Tapped holes 17B for threaded engagement with the extraction bolts 18 are formed in the spacer ring 17 at positions each between adjacent holes 17A. As the extraction bolts 18 are screwed into the tapped holes 17B after extraction of one tapered ring 14, the tip ends of the extraction bolts 18 abut the end faces of the other tapered ring 15, whereby the tapered ring 15 can be pushed out rightwardly in FIGS. 11 and 12 from between the inner ring 12 and the outer ring 13.

In the conventional rotary body fixing device constructed as above there has been a problem such that the spacer ring held between the annular grooves of the inner and outer rings, respectively, shakes and generates noise during rotation of the rotary body fixing device.

Besides, since the spacer ring requires a threading work in plural positions, the number of manufacturing steps is increased. Moreover, the operation for inserting the spacer ring into the space between the inner and outer rings requires the use of a special assembling jig for elastic deformation of both rings and for press-fitting the spacer ring into an axially central part of the space between both rings. This causes an increase in the manufacturing cost of the rotary body fixing device.

Further, when the rotary body fixed onto the shaft by the rotary body fixing device is to be removed, the clamping bolts are loosened. However, as mentioned above, the paired tapered rings are fixed in a self-lock condition between the inner and outer rings. Therefore, it is required to first insert the extraction bolts threadedly into the extraction bolt holes formed in one tapered ring and rotate them to extract the one tapered ring, thereafter insert the same extraction bolts into the tapped holes formed in the spacer and rotate them to push out the other tapered ring. Thus, much labor and time are required for detaching the rotary body from the shaft.

SUMMARY OF THE INVENTION

It is an object of the present invention overcome the above-mentioned problems involved in the conventional rotary body fixing device and provide a rotary body fixing device not generating noise during rotation of the fixing device, having a simple structure, capable of greatly reducing the manufacturing cost, and capable of performing the rotary body removing operation from a shaft easily and rapidly.

In order to achieve the above-mentioned object, the rotary body fixing devices of the illustrated embodiments of the invention are each provided with an elastically deformable inner ring, the inner ring having an inner peripheral surface through which a shaft is to be inserted and also having an outer peripheral surface formed by a pair of tapered surfaces which are larger in diameter toward an axially central part from both sides; an elastically deformable outer ring, the outer ring having an outer peripheral surface to be fitted in a boss hole of the rotary body and also having an inner peripheral surface formed by a pair of tapered surfaces which are smaller in diameter toward an axially central part from both sides; a pair of tapered rings wedged axially from both sides into an annular clearance formed between the inner and outer rings which are disposed concentrically, the paired tapered rings each having an inner peripheral surface formed by a tapered surface conforming to the outer peripheral surface of the inner ring and also having an outer peripheral surface formed by a tapered surface conforming to the inner peripheral surface of the outer ring; and clamping bolts for pulling the paired tapered rings axially toward each other. The mating surfaces of the respective rings are provided with cylindrical land areas to facilitate interlocking of these components into a device capable of being inserted between a rotary body and a shaft, without damage to the mating surfaces during assembly.

By virtue of the interlock between the components of the device, a unitary assembly is provided which may be mounted on the shaft in the position where the rotary body is to be mounted. The assembled device may displaced axially on the shaft to assure proper positioning.

In the rotary body fixing device of the first embodiment of the invention, extraction bolt holes for threaded engagement with extraction bolts are formed axially through one such tapered ring as mentioned above, the extraction bolts come into abutment at their tip ends against an end face of the other tapered ring to move both tapered rings away from each other; an annular groove is formed in the axially central part of at least one of the outer peripheral surface of the inner ring and the inner peripheral surface of the outer ring, the annular groove forms stepped portions between it and the tapered surfaces positioned on both sides of the annular groove; and the paired tapered rings have respective retaining flange portions for engagement with the said stepped portions formed on both sides of the annular groove, the retaining flange portions are formed at the opposed ends of the paired tapered rings or in the vicinity thereof and are adapted to be engaged with the stepped portions at displaced positions of the tapered rings displaced a predetermined length exteriorly from between the inner and outer rings.

In the rotary body fixing device in a second embodiment of the invention, extraction bolt holes for threaded engagement with extraction bolts are formed axially through one such tapered ring as mentioned above, the extraction bolts come into abutment at their tip ends against an end face of the other tapered ring to move both tapered rings away from each other; an annular groove is formed in the axially central part of at least one of the outer peripheral surface of the inner ring and the inner peripheral surface of the outer ring, the annular groove forms a stepped portion between it and the tapered surface along which the one tapered ring is inserted; and the one tapered ring having the extraction bolt holes has a retaining flange portion for engagement with the said stepped portion to prevent an axial movement of the one tapered ring, the retaining flange portion is formed at the end of the one tapered ring opposed to the other tapered ring or in the vicinity thereof, and the retaining flange portion is engaged with the stepped portion at a displaced position of the one tapered ring displaced a predetermined length exteriorly from between the inner and outer rings.

In the first embodiment, a pair of tapered rings are wedged axially from both sides into the space between the inner ring which is mounted on a shaft and the outer ring which is fitted in a boss hole of the rotary body, and the tapered rings are clamped together with clamping bolts. In this way the rotary body is fixed onto the shaft through the rotary body fixing device. When the rotary body is to be removed from the shaft, the clamping bolts are loosened and disengaged from the tapered rings, then extraction bolts are screwed into the extraction bolt holes formed in one tapered ring and are rotated, allowing the tip ends of the extraction bolts to come into abutment against an end face of the other tapered ring to move both tapered rings away from each other.

With continued screwing of the extraction bolts, the retaining flange portion of the tapered ring which was the first to move outward, out of the paired tapered rings wedged into the space between the inner and outer rings, comes into abutting engagement with a stepped portion the annular groove formed in at least one of the inner and outer rings, so that the tapered ring stops. Then, the other tapered ring moves outward until its retaining flange portion is abutted against a stepped portion of the annular groove formed in at least one of the inner and outer rings. Now, both tapered rings are in a projected state by a predetermined length axially from both sides and from between the inner and outer rings.

In this state, by virtue of an elastic restoring force, the inner peripheral surface of the inner ring becomes larger in diameter, while the outer peripheral surface of the outer ring becomes smaller in diameter, whereby the clamped state between the shaft and the rotary body is released.

On the other hand, the second embodiment is applicable to the case where the boss hole of the rotary body is formed as a stepped hole or as a blind hole, or where the shaft with the inner ring mounted thereon has a stepped portion or a flange portion. Its structure is more simplified than that of the first embodiment. The fixing of the rotary body to the shaft is performed in the same manner as in the first embodiment. However, the outer end face of the other tapered ring not having extraction bolt holes is abutted against, for example, a stepped portion in the boss hole of the rotary body or a stepped portion of the shaft and then clamping bolts are tightened, whereby the rotary body is fixed onto the shaft in a slightly spaced state of the outer end face of the other tapered ring from the above stepped portion. When the rotary body is to be removed from the shaft, extraction bolts are threadedly engaged with the extraction bolt holes formed in one tapered ring and are rotated, in the same way as in the rotary body fixing device described in connection with the first embodiment.

At this time, in the case where one tapered ring with extraction bolts inserted therein starts moving earlier than the other tapered ring, its retaining flange portion comes into abutment against a stepped portion of the annular groove formed in at least one of the inner ring and the outer ring, so that the one tapered ring stops. Thereafter, the other tapered ring is pushed outward to release the clamped state between the shaft and the rotary body.

On the other hand, in the case where the other tapered ring is the first to move, the outer end face of the other tapered ring comes into abutment against the stepped portion in the boss hole of the rotary body or the stepped portion of the shaft, whereupon the other tapered ring stops. Thereafter, one tapered ring with extraction bolts inserted therein starts moving and its retaining flange portion is abutted against a stepped portion of the annular groove formed in at least one of the inner ring and the outer ring. Then, the inner and outer rings move together with the one tapered ring while leaving the other tapered ring behind, and eventually both tapered rings are displaced from between the inner and outer rings to release the clamped state between the shaft and the rotary body.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENTS

Embodiments of the present invention will be described hereinafter with reference to the accompanying drawings. According to a first embodiment of the present invention, the rotary body fixing device, indicated at 1, is provided with an elastically deformable inner ring 2 to be fitted on a shaft, an elastically deformable outer ring 3 to be fitted in a boss hole of a rotary body such as, for example, sprocket, gear, or pulley, a pair of tapered rings 4 and 5 which are wedged axially from both sides into a clearance formed between the inner ring 2 and the outer ring 3, and clamping bolts 9 for axially clamping the paired tapered rings.

An inner peripheral surface 2A of the inner ring 2 is finished to have an inside diameter conforming to the outside diameter of a shaft (not shown). On the other hand, an outer peripheral surface of the inner ring 2 is constituted by a pair of tapered surfaces 2B and 2C and an annular groove 2D formed between the paired tapered surfaces 2B and 2C and extending in the circumferential direction. The paired tapered surfaces 2B and 2C are formed so as to become gradually larger in diameter toward an axially central part from both sides.

An outer peripheral surface 3A of the outer ring 3 is finished to have an outside diameter conforming to the inside diameter of a boss hole of the rotary body (not shown). On the other hand, an inner peripheral surface of the outer ring 3 is constituted by a pair of tapered surfaces 3B and 3C and an annular groove 3D formed between the paired tapered surfaces 3B and 3C and extending in the circumferential direction. The paired tapered surfaces 3B and 3C are formed so as to become gradually larger in diameter toward an axially central part from both sides.

Figure 4:
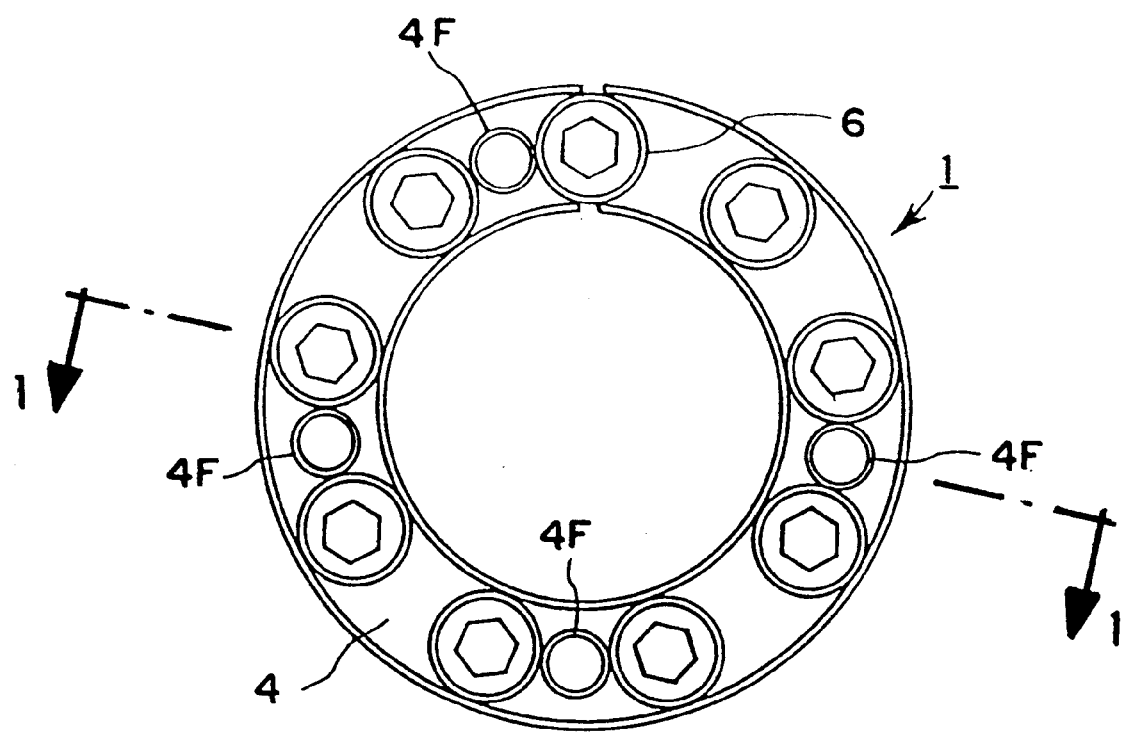
FIG. 4 is a side view of the rotary body fixing device showing the section line 1—1 or the sectional views of FIGS. 1–3.

Axially through one tapered ring 4 are formed clamping bolt holes 4A for insertion therein of clamping bolts 9 exclusive of bolt heads 6A. In the other tapered ring 5 are formed tapped holes 5A coaxially with the clamping bolt holes 4A so that threaded portions 6B of the clamping bolts 6 can be threadedly engaged with the tapped holes 5A. The clamping bolt holes 4A and the tapped holes 5A are formed in plural positions at equal intervals in the circumferential direction of the tapered rings 4 and 5, respectively. As shown in FIG. 4, in the present instance there are nine clamping bolt holes at 40 degree intervals about the circumference of the rings 4 and 5.

The inner peripheral surfaces of both tapered rings 4 and 5 are respectively formed by tapered surfaces 4B and 5B having a taper angle conforming to the tapered surfaces 2B and 2C of the inner ring 2, while the outer peripheral surfaces of both tapered rings 4 and 5 are respectively formed by tapered surfaces 4C and 5C having a taper angle conforming to the tapered surfaces 3B and 3C of the outer ring 3.

The tapered rings 4 and 5 are designed to interlock with the inner and outer rings 2 and 3 so as to enable the components to be preassembled prior to mounting on the shaft and within the bore of the rotary body. To this end the inner and outer rings have central grooves to receive flanges at the inner ends of the tapered rings.

Retaining flange portions 4D and 5D are formed on the inner periphery sides of the opposed end portions of the paired tapered rings 4 and 5, respectively, so as to be positioned within the annular groove 2D of the inner ring 2. Likewise, retaining flange portions 4E and 5E are formed on the outer periphery sides of the opposed end portions of the tapered rings 4 and 5, respectively, so as to be positioned within the annular groove 3D formed in the inner peripheral surface of the outer ring 3.

Figure 1:
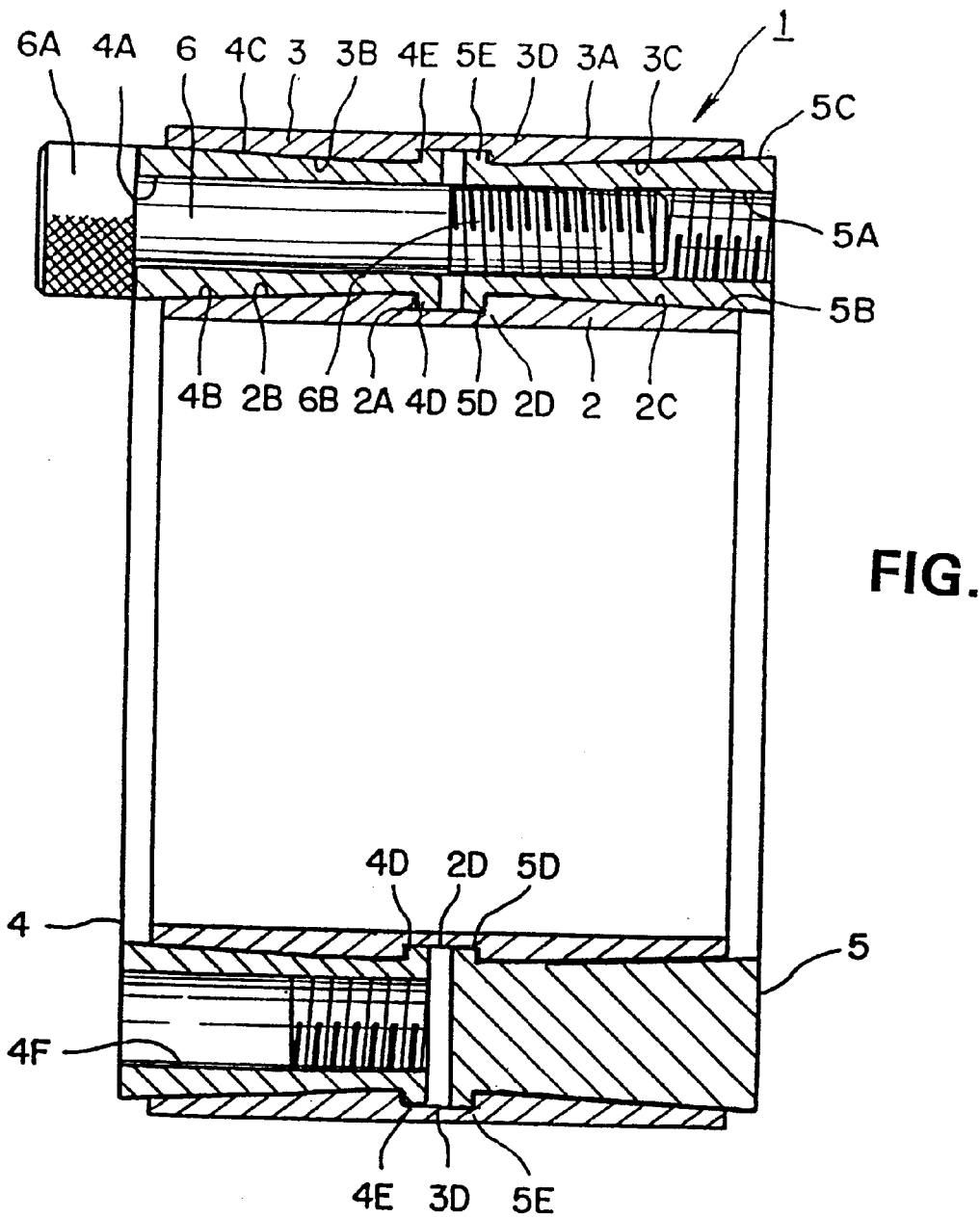
FIG. 1 is a sectional view of a rotary body fixing device according to a first embodiment of the present invention with clamping bolts tightened.

FIG. 1 shows a tightened state of the clamping bolts 6, in which the paired tapered rings 4 and 5 are displaced axially toward each other by the clamping bolts 6. As the bolts are screwed into the tapped holes, the paired tapered surfaces 2B and 2C of the inner ring 2 are pressed radially inward by the tapered surfaces 4B and 5B of the tapered rings 4 and 5, respectively. As a result, the inner ring 2 elastically deforms radially inward and its inner peripheral surface 2A is reduced in diameter. Consequently, when the inner ring 2 is fitted on a shaft, the inner peripheral surface 2A is pressed against the outer peripheral surface of the shaft, so that the inner ring 2 is fixed frictionally onto the shaft.

In the state shown in FIG. 1, the paired tapered surfaces 3B and 3C of the outer ring 3 are pressed radially outward by the tapered surfaces 4C and 5C of the tapered rings 4 and 5, respectively. As a result, the outer ring 3 elastically deforms radially outward and its outer peripheral surface 3A becomes larger in diameter. Consequently, when the outer ring 3 is fitted in the boss hole of the rotary body, the outer peripheral surface 3A is pressed against the inner peripheral surface of the boss hole, so that the outer ring 3 is fixed frictionally onto the rotary body. Accordingly, the shaft and the rotary body are firmly connected and fixed together by inserting the rotary body fixing device 1 between the two and then tightening the bolts.

As shown in FIG. 1, extraction bolt holes 4F are formed axially through one tapered ring 4 in a plurality of circumferential positions. In the present instance, there are four extraction bolt holes 4F, each between an adjoining pair of the clamping holes 4A of the outer ring 4. The ring 5 may be provided with similar extraction bolt holes, but the rings 4 and 5 are rotated so that the extraction holes in the two rings are not aligned. The inner surface portion of each extraction bolt hole 4F on the side opposed to the other tapered ring 5 is formed with internal threads for threaded engagement with an extraction bolt which will be described below.

Figure 2:
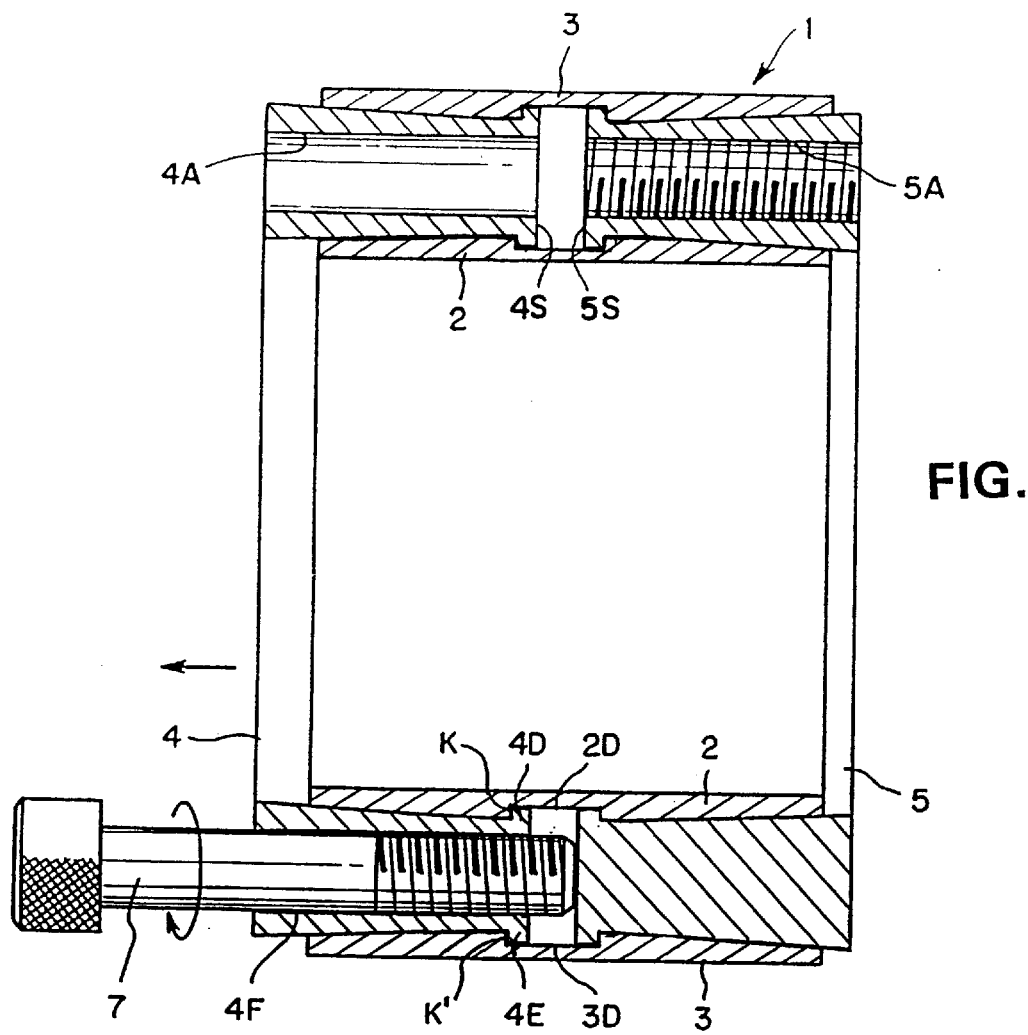
FIG. 2 is a sectional view of the rotary body fixing device with clamping bolts removed and showing an extraction bolt after displacing one tapered ring outwardly.
Figure 3:
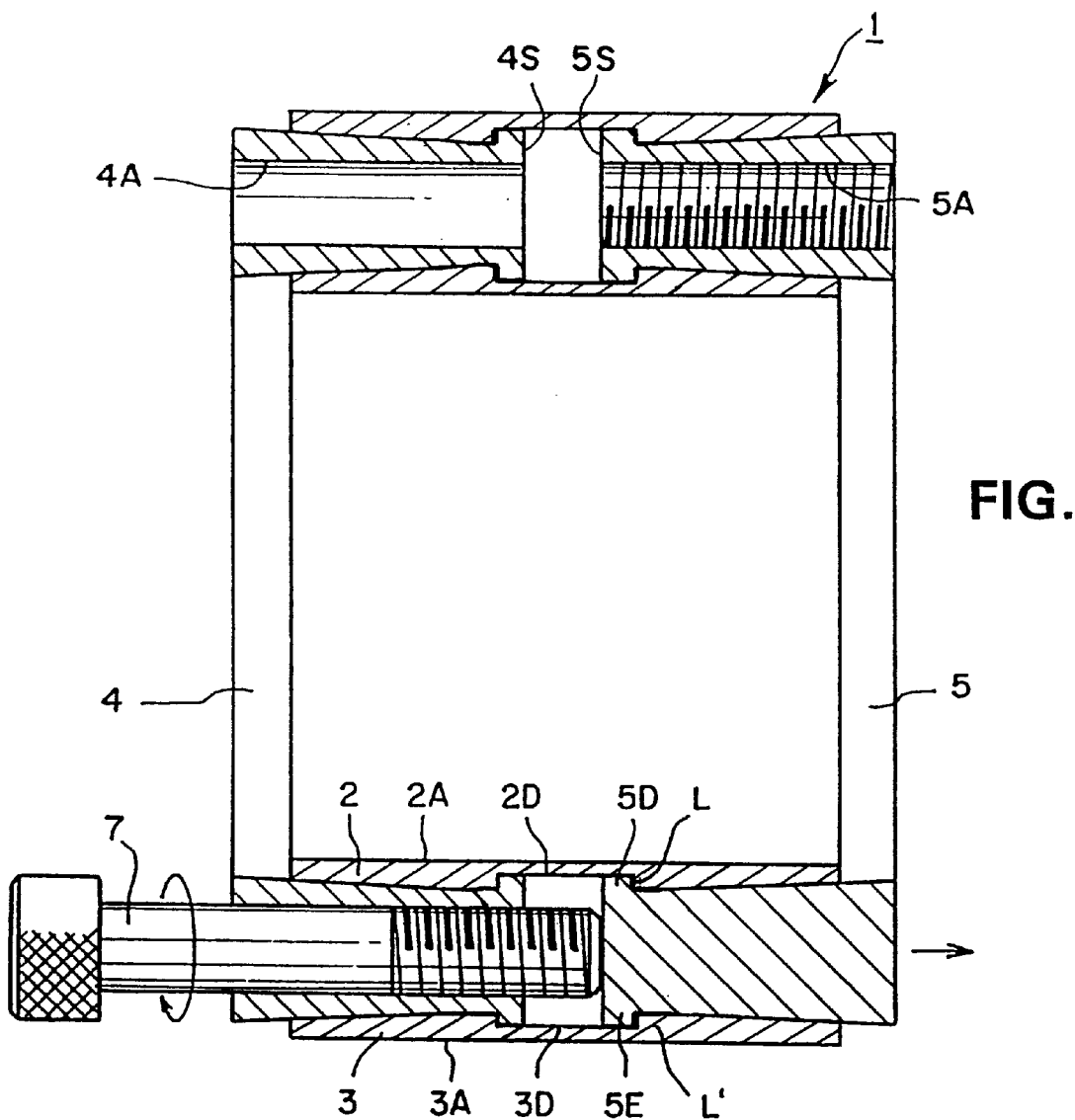
FIG. 3 is a sectional view of the rotary body fixing device with both tapered rings displaced outwardly.

FIGS. 2 and 3 show the procedure by which the rotary body fixed to the shaft by the rotary body fixing device 1 is removed from the shaft. The shaft and the rotary body are not shown in those figures. For releasing the clamped state of the rotary body fixing device 1, first as shown in FIG. 2, all the clamping bolts are removed and instead extraction bolts 10 are brought into threaded engagement with the internal threads of the extraction bolt holes 4F formed in plural positions of the tapered ring 4. As the extraction bolts 7 are equally rotated and advanced, their tip ends come into abutment against the end face of the tapered ring 5 opposed thereto, whereby the tapered ring 5 is urged rightward in FIG. 2.

On the other hand, since the extraction bolts 7 are threadedly engaged with the internal threads of the extraction bolt holes 4F, the tapered ring 4 is urged leftwardly in FIG. 2 by virtue of a reaction force acting on the extraction bolts 7 from the tapered ring 5. Upon further rotation of the extraction bolts 7, either the tapered ring 4 or the tapered ring 5 is the first to be displaced outwardly so as to displace its outer face from between the inner ring 2 and the outer ring 3. Which of the tapered rings 4 and 5 is the first to start moving depends on the magnitude of a frictional force exerted between the inner and outer rings 2,3.

In FIG. 2, the tapered ring 4 is the first to start moving, which movement is stopped when the retaining flange portions 4D and 4E of the tapered ring 4 are abutted against leftmost ends K and K' of the annular grooves 2D and 3D of the inner and outer rings 2, 3, respectively.

Thereafter, as the extraction bolts 7 are further rotated and advanced, as shown in FIG. 3, the tapered ring 5 is moved rightwards in the same figure and stops when the retaining flange portions 5D and 5E are abutted against rightmost ends L and L' of the annular grooves 2D and 3D, respectively.

After the tapered rings 4 and 5 have thus been extracted from between the inner and outer rings 2,3, the inner peripheral surface 2A of the inner ring 2 becomes slightly larger in diameter to release the clamping force for the shaft. At the same time, the outer peripheral surface 3A of the outer ring 3 is slightly reduced in diameter to the extent of permitting removal of the rotary body fixing device from the boss hole of the rotary body. In this way the rotary body can be removed from the shaft.

Figure 5:
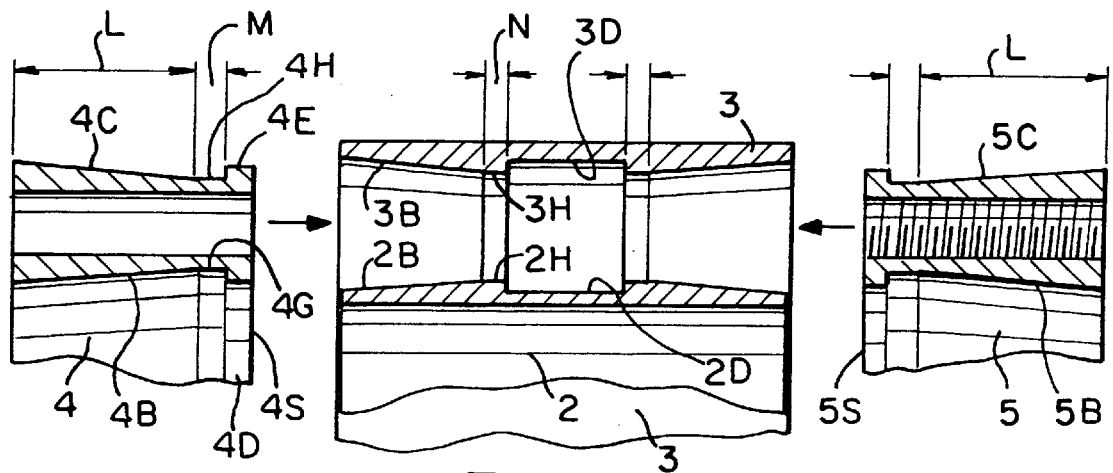
FIG. 5 is a fragmentary sectional view showing both tapered rings prior to assembly between the inner and outer rings of the fixing device.
Figure 6:
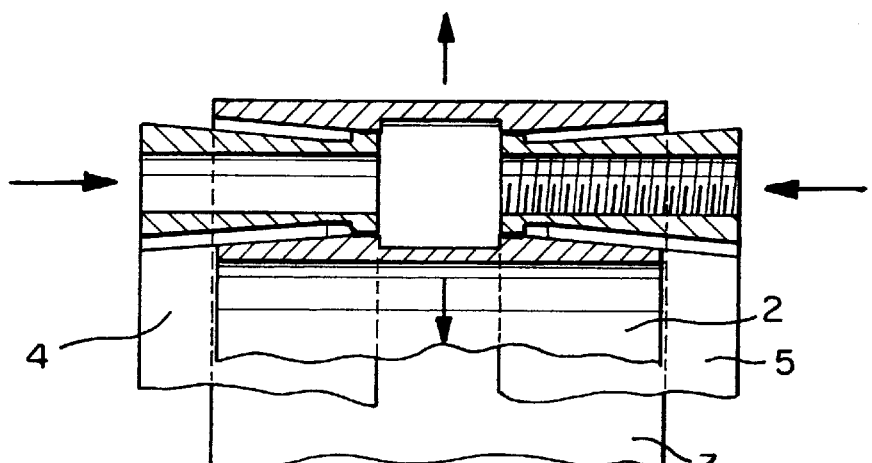
FIG. 6 is a fragmentary sectional view showing both tapered rings in position about to interlock with the inner and outer rings during assembly of the device for subsequent engagement between a rotary body and a shaft.
Figure 7:
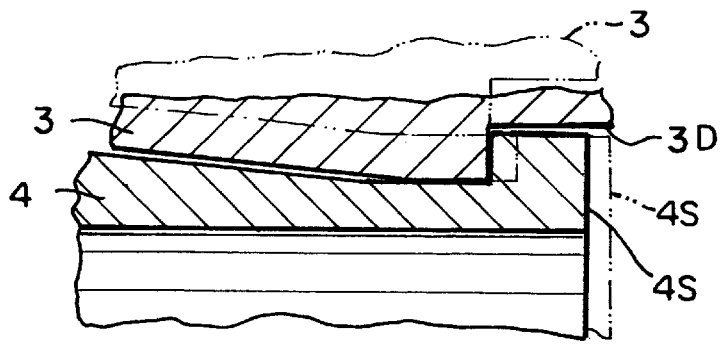
FIG. 7 is an enlarged fragmentary view illustrating the movement of a tapered ring into interlocking relation with the outer ring, the broken lines showing the relative movements of the tapered ring and the outer ring.

FIGS. 5–7 illustrate the assembly of the components into a unitary device which may be mounted on a shaft at any axial position so as to fix a rotary body at any desired position along the shaft. As shown in FIG. 5, the inner ring 2 is positioned within the outer ring 3 so that their respective central grooves 2D and 3D are aligned in registry with one another. The tapered rings 4 and 5 are then inserted axially between the rings 2 and 3. The tapered surfaces 4B and 4C are sufficiently steep so that the length L of the tapered surface makes the outside diameter of the tapered ring 4 greater than the outer diameter of the flange 4E and the inner diameter of the outer end of the tapered ring 4 smaller than the inner diameter of the flange 4D. Thus, the flanged end of the tapered ring 4 fits easily within the spacing between the inner and outer rings 2 and 3. The surfaces 5B and 5C of the ring 5 have a similar length L.

When the rings 4 and 5 are forced inwardly, the inner and outer surfaces of the flanges 4D and 4E, respectively, cause the inner and outer rings to contract and expand, respectively, by reason of elastic deformation, the rings being split as shown in FIG. 4. When the flanges reach the inner ends of the tapered surface, further axial displacement, as shown in FIG. 6, displaces the flanges into the grooves 2D and 3D. As shown in FIG. 7, the movement of the flange of the tapered ring 4 into the groove 3D allows the outer ring 3 to contract from its expanded position shown at 3 in broken lines in FIG. 7 to the full-line position shown.

It is desired to permit limited axial movement of the tapered ring 4 within the central grooves of the inner and outer rings 2 and 3, as shown by the broken lines 4S in FIG. 7. When the bolts 6 are tightened to drive the tapered rings 4 and 5 down the tapered surfaces of the inner and outer rings 2 and 3, the inner end of the flanges 4D and 4E of the tapered ring 4 and the flanges 5D and 5E of the tapered ring 5 are drawn toward the center of the device, and the interengagement of the mating tapered surfaces effects expansion of the outer ring 3 and contraction of the inner ring 2 to enable the device to firmly fix the rotary body in a selected position along a shaft.

In order to assure clearance between the flange and the ends of the central grooves, an annular cylindrical flat 4H is provided between the flange 4E and the tapered surface 4C and a similar annular cylindrical flat 4G is provided between the flange 4D and the tapered surface 4B. A similar annular cylindrical flat is provided between the central grooves and the tapered surfaces of the inner and outer rings. As shown in FIG. 5, the outer ring 3 has a flat annular land area 3H between the groove 3D and the tapered surface 3B and a flat annular land area 2H between the groove 2D and the tapered surface 2B. Similar flats are provided at the other side of the groove. In order to allow axial displacement of the tapered ring relative to the outer ring, as shown in FIG. 7, the length of the annular flats 2H and 3H, indicated by the reference character N in FIG. 5, is less than the axial length of the flats 4G and 4H, indicated by the reference character M in FIG. 5. Thus, when the flanges 4E and 4D pass into the grooves 2D and 3D, the greater length of the flat M provides clearance between the outer surface 4C and the inner surface 3B and also between the inner surface 4B and the outer surface 2B.

When the fastener 6 is actuated to draw the parts together, the tapered ring 4C is displaced toward the center of the inner and outer rings and when the displacement exceeds the difference in length of the flats M and N, the tapered surfaces or the tapered ring 4 engage the tapered surfaces of the inner and outer rings 2 and 3 and effect expansion of the outer ring and contraction of the inner ring. As shown in FIG. 7, the clearance between the outer ring 3 and the tapered ring 4 allows the inner end surface 4S of the ring 4 to move inwardly to the position shown in broken lines before the clearance is closed.

Although it is desirable to have the length of the flats 4G and 4H to be greater than the lengths of the flats 2H and 3H, the difference may be minimized, depending upon the degree of movement desired prior to engagement of the mating tapered surfaces of the tapered ring 4 with the inner and outer rings 2 and 3. The cylindrical land areas beyond the opposite ends of the central grooves in the inner and outer rings provide a transverse step facing the medial part of the device which may function to capture the flanges at the inner end of the tapered rings.

The cylindrical land area at the inner end of the tapered surfaces of the inner and outer rings facilitates the assembly of the device since the cylindrical land areas cooperate with the cylindrical perimeter of the flanges to effect expansion and contraction of the outer and inner rings, respectively, during assembly. In the course of assembly, when the flanges of the tapered rings pass beyond the land areas of the inner and outer rings, the resilient deformation of the inner and outer rings causes the outer ring to contract and the inner ring to expand so that the land areas of the inner and outer rings mate with the land areas of the tapered ring.

The smaller the difference between the axial length of the respective land areas, indicated M and N in FIG. 5, the less clearance exists between the flange and the stepped area when the tapered surfaces engage to effect expansion and contraction of the outer and inner rings, respectively. On the other hand, increasing the difference will require greater displacement of the tapered rings and a greater number of turns of the clamping bolts 6 is required to initiate expansion and contraction of the outer and inner rings, respectively.

When the land surfaces are mated as shown in FIG. 7, the inner diameter of the inner ring 2 is larger than the diameter of the shaft, and the outer diameter of the outer ring 3 is smaller than the internal diameter of the bore in the rotary body, thereby facilitating assembly of the device between the rotary body and the shaft.

Figure 8:
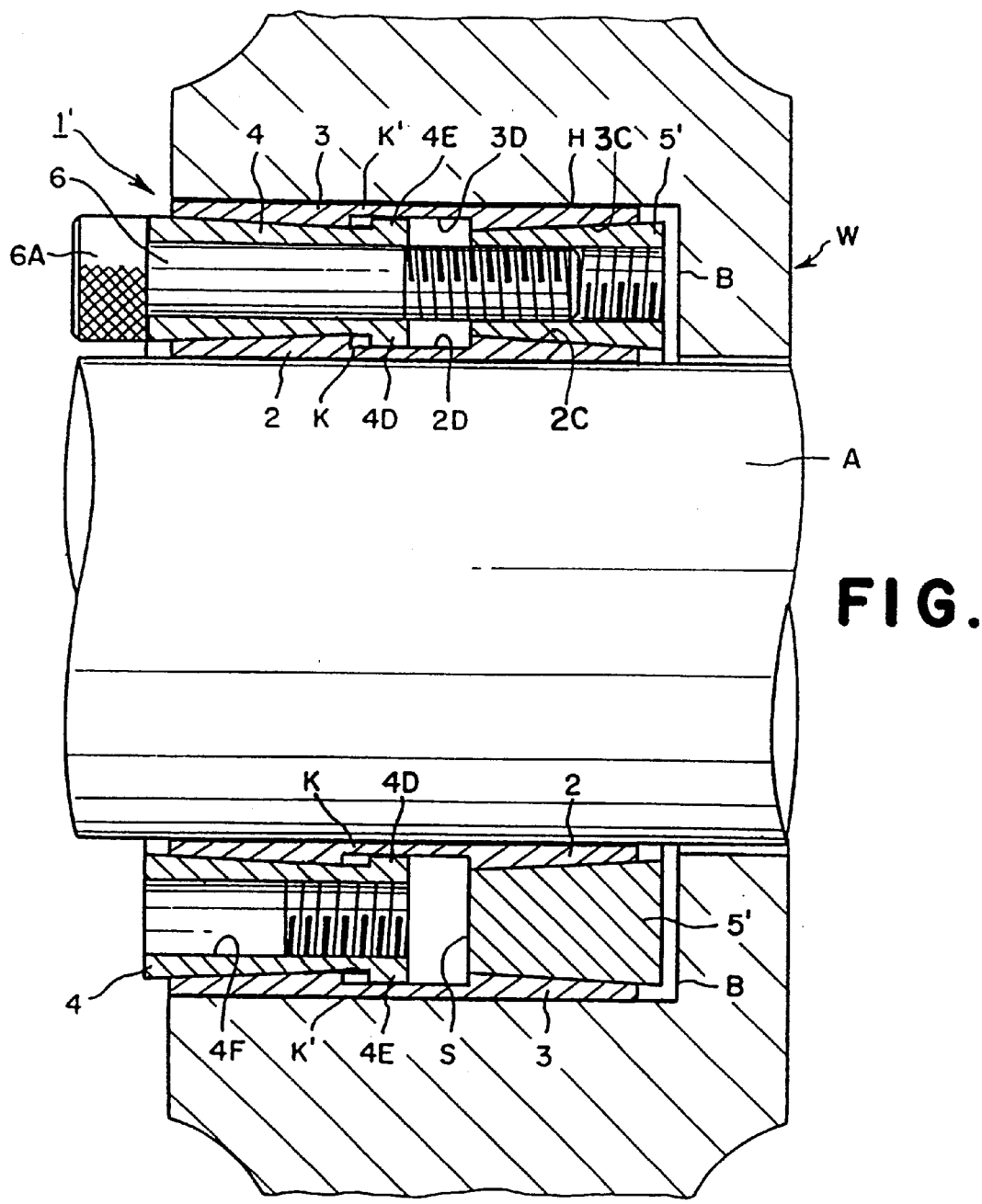
FIG. 8 is a sectional view similar to FIG. 1 illustrating a rotary body fixing device according to a second embodiment of the present invention.
Figure 9:
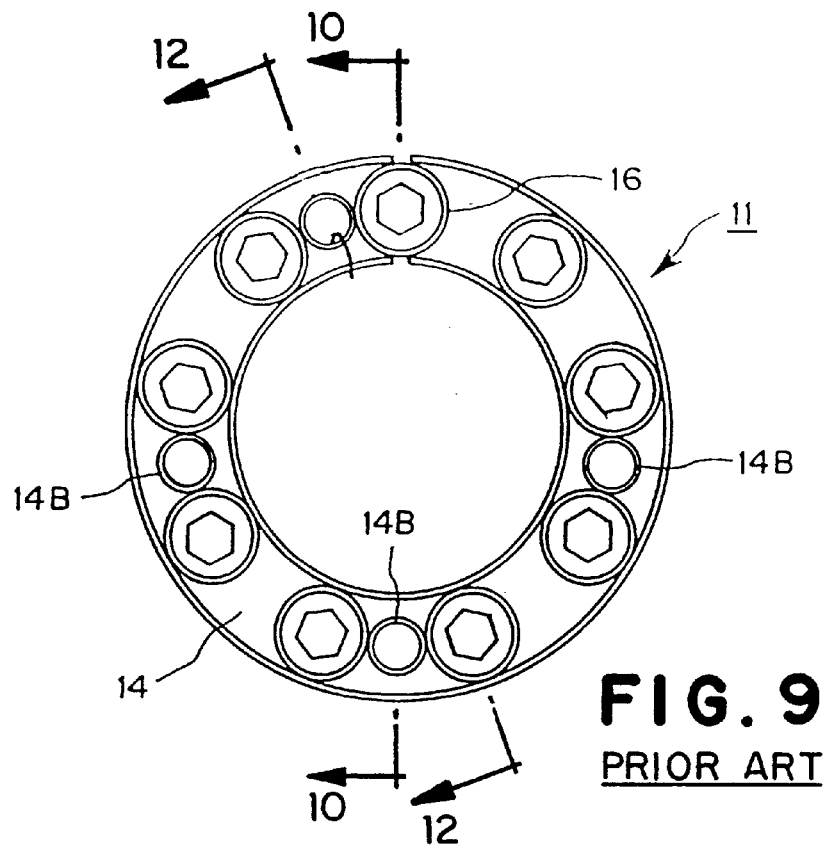
FIG. 9 is a side view showing an example of a conventional rotary body fixing device.
Figure 10:
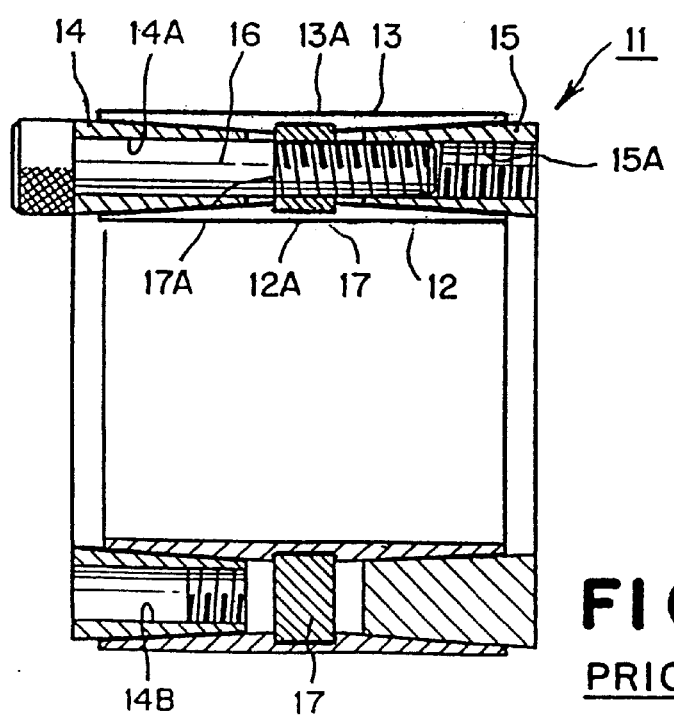
FIG. 10 is a sectional view thereof taken on the line 10—10 of FIG. 9.
Figure 11:
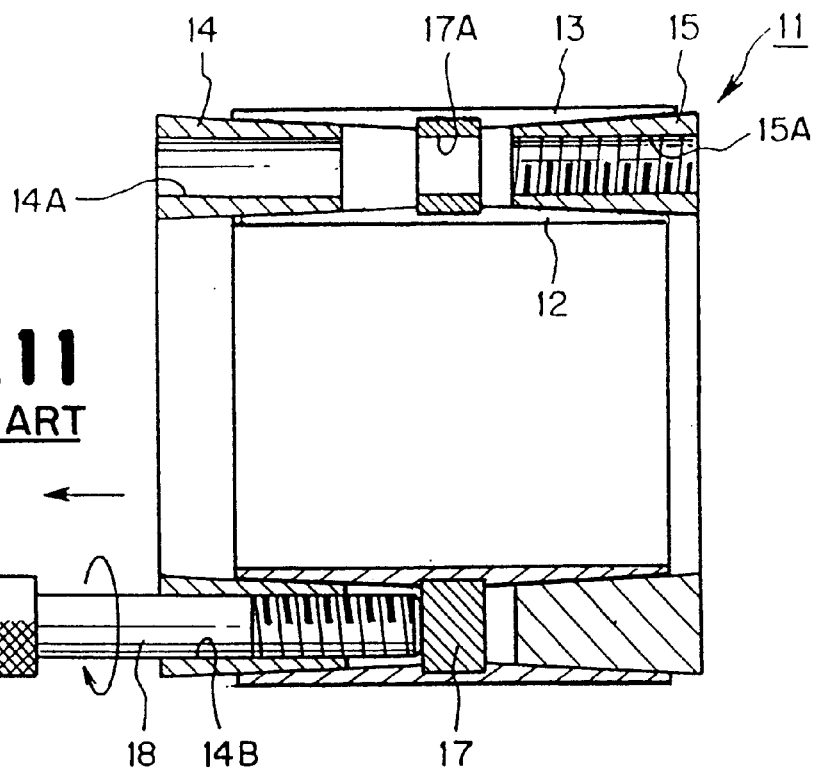
FIG. 11 is a sectional view of the device with one tapered ring displaced outwardly.
Figure 12:
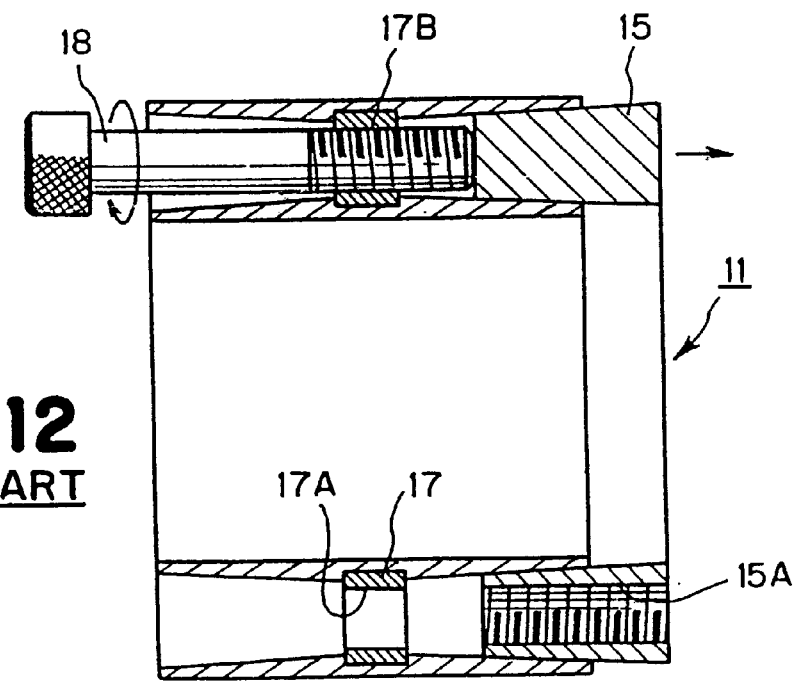
FIG. 12 is a sectional view taken on the line 12—12 of FIG. 9 of the device with one tapered ring removed and the other tapered ring displaced outwardly.

Referring now to FIG. 8, there is illustrated a rotary body fixing device according to a second embodiment of the present invention. This rotary body fixing device, indicated at 1', employs the same components as in the rotary body fixing device 1 of the first embodiment illustrated in FIG. 1, provided a tapered ring 5' is used in place of the tapered ring 5 used in the first embodiment.

In this second embodiment, only the tapered ring 4 located on the side where the heads 6A of clamping bolts 6 are positioned is formed with retaining flange portions 4D and 4E for engagement respectively with stepped portions K and K' of annular grooves 2D and 3D which are formed in the inner and outer rings 2,3. In this embodiment the inner and outer rings 2 and 3 have tapered outer and inner surfaces respectively which merge into the central grooves 2D and 3D with annular cylindrical flats, as described above, and the tapered ring 4 has cylindrical flats between its tapered surfaces and its flanges.

The rotary body fixing device of this embodiment is applicable to cases where the boss hole of a rotary body is formed as a stepped hole or a blind hole, or where a shaft on which the inner ring is to be fitted has a stepped portion or a flange portion, for the purpose of diminishing the machining work for the boss hole or for enhancing the mounting accuracy of the rotary body with respect to the shaft. Since the tapered ring 5' is not provided with a retaining flange portion, there is no need to provide annular cylindrical flats, and it is therefore possible to simplify the manufacturing process.

In this embodiment it suffices for the stepped portions K and K' to be formed only between the tapered surface 2B and the annular groove 2D and between the tapered surface 3B and the annular groove 3D. In the illustrated embodiment, the ring 2 is identical to the ring 2 of the first embodiment, but the tapered surface 2C and the annular groove 2D may be contiguous to each other through a slant or curved surface for example. The same is also true of the tapered surface 3C and the annular groove 3D of the ring 3.

As shown in FIG. 8, a boss hole H of a rotary body W is formed with a stepped portion B, and the rotary body fixing device 1' is disposed within the boss hole 1 H while the outer end face of the tapered ring 5' is abutted against the stepped portion B. By tightening the clamping bolts 6, the tapered ring 5' is pulled in between the inner ring 2 and the outer ring 3, leaving a slight clearance between the outer end face of the tapered ring 5' and the stepped portion B. In this state the rotary body W is fixed onto the shaft A. For removing the rotary body W from the shaft A, extraction bolts (not shown) are threadedly engaged with the internal threads of extraction bolt holes 4F formed in the tapered ring, in the same manner as in the first embodiment.

Then, the extraction bolts are rotated and advanced, with the result that the tip ends of the extraction bolts push against the inner end face, indicated at S, of the tapered ring 5'. As is the case with the previous first embodiment, which of the tapered rings 4 and 5' is the first to start moving depends on the magnitude of a frictional force exerted between the inner ring 2 and the outer ring 3. In the case where one tapered ring 4 with extraction bolts inserted therein started to move earlier than the other tapered ring 5', its retaining flange portions 4D and 4E come into abutment against the stepped portions K and K' of the annular grooves 2D and 3D, respectively, so that the tapered ring 4 stops moving. Thereafter, the other tapered ring 5' is pushed outward to release the clamped state between the shaft A and the rotary body W.

On the other hand, in the case where the other tapered ring 5' was the first to move, its outer end face comes into abutment against the stepped portion B in the boss hole H of the rotary body W, whereupon the other tapered ring 5' stops moving. Thereafter, the tapered ring 4 with extraction bolts inserted therein starts moving and its retaining flange portions 4D and 4E are abutted against the stepped portions K and K' of the inner and outer rings 2, 3, respectively. Then, both rings move together with the one tapered ring 4 while leaving the other tapered ring 5' behind. In this way the tapered rings 4 and 5' located on both sides are forced out from between the inner and outer rings 2,3 to release the clamped state between the shaft A and the rotary body W.

Although in both embodiments described above the retaining flange portions of the tapered ring(s) are formed on both inner and outer peripheral surfaces of the tapered ring(s), a change may be made so that a retaining flange portion is formed on either the inner periphery side or the outer periphery side and an annular groove is formed in either the outer peripheral surface of the inner ring or the inner peripheral surface of the outer ring.

The rotary body fixing device according to the present invention, unlike similar conventional devices, does not use a spacer ring which causes vibration between inner and outer rings during rotation of the rotary body fixing device, so there is no fear of noise generation during use of the device. Besides, the rotary body fixing device can be assembled rapidly and easily by only press-fitting tapered rings into the space between the inner and outer rings. Moreover, since the spacer ring of the first device requires machining for the formation of plural tapped holes, by eliminating the spacer ring it is possible to greatly reduce the manufacturing cost.

Further, the rotary body fixing device according to the present invention is further advantageous in that, at the time of removing the rotary body from the shaft, the tapered rings located on both sides can be extracted simultaneously from between the inner and outer rings without the need of pulling out each extraction bolt from one tapped hole and inserting it into another tapped hole, this permits the rotary body removing operation to be performed easily and efficiently.

In addition to the above-described effects, the rotary body fixing device of the first embodiment is further advantageous in that, since the paired tapered rings do not become separated with respect to the inner and outer rings, it is possible to prevent the loss of components, and the rotary body fixing device can be handled more easily during mounting or removal thereof.

The rotary body fixing device of the second embodiment can contribute to the improvement of productivity and further reduction of the manufacturing cost because retaining flange portions may be formed on only one tapered ring.

While particular embodiments of the invention have been herein illustrated and described, it is not intended to limit the invention to such disclosures, but changes and modifications may be made therein and thereto within the scope of the following claims.

I claim:

1. In a fixing device for a rotary body, said device having a rotary axis and a medial part between the axial ends of said device including:

an elastically deformable inner ring having an inner peripheral surface along which a shaft is to be inserted and an outer peripheral surface formed by a pair of tapered surfaces which are larger in diameter toward the medial part;

an elastically deformable outer ring having an outer peripheral surface to be fitted in a boss hole of the rotary body and an inner peripheral surface formed by a pair of tapered surfaces which are smaller in diameter toward the medial part;

said inner and outer rings being concentric and providing an annular clearance therebetween;

a pair of tapered rings wedged axially from both sides into said annular clearance, said paired tapered rings each having an inner peripheral surface formed by a tapered surface conforming to the outer peripheral surface of said inner ring and an outer peripheral surface formed by a tapered surface conforming to the inner peripheral surface of said outer ring; and clamping means for pulling said paired tapered rings axially toward each other to a clamping position; the improvement wherein said outer elastically deformable ring has an annular groove formed adjacent the medial part in the inner peripheral surface of said outer ring, said groove being larger in diameter than the smallest diameter of said of tapered surfaces of the outer ring, at least one land area axially outward from said annular groove between said groove and at least one of said tapered surfaces of the outer ring, said land area having a cylindrical diameter corresponding to the smallest diameter of said tapered surfaces of the outer ring, said cylindrical land area forming a transverse step facing the medial part of the device between the groove and said at least one tapered surface of the outer ring, at least one of said paired tapered rings having a transverse end face confronting the medial part of the device, and a retaining flange portion for engagement beyond said transverse step within said annular groove, said at least one retaining flange portion having a cylindrical surface extending from said transverse end face toward the tapered surface, said tapered ring having a cylindrical land area between said flange portion and the tapered surface, said cylindrical flange surface and land area being different in diameter so as to provide a radial abutment surface on said at least one tapered ring adapted to engage behind said step, the cylindrical flange surface of said at least one tapered ring being of lesser axial length than the axial length of said annular groove to enable said flange to seat within said annular groove, and the axial length of the land area of said outer elastically deformable ring being not greater than the axial length of said land area of the at least one tapered ring to enable said respective land areas to mate.

2. A fixing device according to claim 1 wherein said step and said abutment surface comprise flat radial surfaces forming ninety degree angles with said cylindrical surfaces.

3. A fixing device according to claim 1 wherein the axial length of said land area of the deformable ring is smaller than the axial length of the land area of the tapered ring, providing a clearance between the abutment surfaces and the steps when said tapered surfaces of the deformable ring and the tapered ring mate.

4. A fixing device according to claim 1 wherein there are two land areas in the inner peripheral surface of said outer ring, said land areas being beyond the opposite axial ends of said groove and forming transverse steps, each of said paired tapered rings having a transverse end face and a retaining flange portion to seat within said annular groove beyond one of said transverse steps.

5. In a fixing device for a rotary body, said device having a rotary axis and a medial part between the axial ends of said device including:

an elastically deformable inner ring having an inner peripheral surface along which a shaft is to be inserted and an outer peripheral surface formed by a pair of tapered surfaces which are larger in diameter toward the medial part;

an elastically deformable outer ring having an outer peripheral surface to be fitted in a boss hole of the rotary body and an inner peripheral surface formed by a pair of tapered surfaces which are smaller in diameter toward the medial part;

said inner and outer rings being concentric and providing an annular clearance therebetween;

a pair of tapered rings wedged axially from both sides into said annular clearance, said paired tapered rings each having an inner peripheral surface formed by a tapered surface conforming to the outer peripheral surface of said inner ring and an outer peripheral surface formed by a tapered surface conforming to the inner peripheral surface of said outer ring; and clamping means for pulling said paired tapered rings axially toward each other to a clamping position; the improvement wherein said inner elastically deformable ring has an annular groove formed adjacent the medial part in the outer peripheral surface of said inner ring, said groove being smaller in diameter than the largest diameter of said tapered surfaces of the inner ring, at least one land area axially outward from said annular groove between said groove and at least one of said tapered surfaces of the inner ring, said land area having a cylindrical diameter corresponding to the largest diameter of said tapered surfaces of the inner ring, said cylindrical land area forming a transverse step facing the medial part of the device between the groove and said at least one tapered surface of the inner ring, at least one of said paired tapered rings having a transverse end face confronting the medial part of the device, and a retaining flange portion for engagement beyond said transverse step within said annular groove, said at least one retaining flange portion having a cylindrical surface extending from said transverse end face toward the tapered surface, said tapered ring having a cylindrical land area between said flange portion and the tapered surface, said cylindrical flange surface and land area being different in diameter so as to provide a radial abutment surface on said at least one tapered ring adapted to engage behind said step, the cylindrical flange surface of said at least one tapered ring being of lesser axial length than the axial length of said annular groove to enable said flange to seat within said annular groove, and the axial length of the land area of said inner elastically deformable ring being not greater than the axial length of said land area of the at least one tapered ring to enable said respective land areas to mate.

6. A fixing device according to claim 5 wherein said step and said abutment surface comprise flat radial surfaces forming ninety degree angles with said cylindrical surfaces.

7. A fixing device according to claim 5 wherein the axial length of said land area of the deformable ring is smaller than the axial length of the land areas of the tapered ring, providing a clearance between the abutment surfaces and the steps when said tapered surfaces of the deformable ring and the tapered ring mate.

8. A fixing device according to claim 5 wherein there are two land areas in the outer peripheral surface of said inner ring, said land areas being beyond the opposite axial ends of said groove and forming transverse steps, each of said paired tapered rings having a transverse end face and a retaining flange portion to seat within said annular groove beyond one of said transverse steps.

9. In a fixing device for a rotary body, said device having a rotary axis and a medial part between the axial ends of said device including:

an elastically deformable inner ring having an inner peripheral surface along which a shaft is to be inserted and an outer peripheral surface formed by a pair of tapered surfaces which are larger in diameter toward the medial part;

an elastically deformable outer ring having an outer peripheral surface to be fitted in a boss hole of the rotary body and an inner peripheral surface formed by a pair of tapered surfaces which are smaller in diameter toward the medial part;

said inner and outer rings being concentric and providing an annular clearance therebetween;

a pair of tapered rings wedged axially from both sides into said annular clearance, said paired tapered rings each having an inner peripheral surface formed by a tapered surface conforming to the outer peripheral surface of said inner ring and an outer peripheral surface formed by a tapered surface conforming to the inner peripheral surface of said outer ring; and clamping means for pulling said paired tapered rings axially toward each other to a clamping position; the improvement wherein said inner elastically deformable ring has an annular groove formed adjacent the medial part in the outer peripheral surface of said inner ring, said groove being smaller in diameter than the largest diameter of said of tapered surfaces of the inner ring, at least one land area axially outward from said annular groove between said groove and at least one of said tapered surfaces of the inner ring, said land area having a cylindrical diameter corresponding to the largest diameter of said tapered surfaces of the inner ring, said cylindrical land area forming a transverse step facing the medial part of the device between the groove and said at least one tapered surface of the inner ring, said outer elastically deformable ring has an annular groove formed adjacent the medial part in the inner peripheral surface of said outer ring, said groove being larger in diameter than the smallest diameter of said tapered surfaces of the outer ring, at least one land area axially outward from said annular groove between said groove and at least one of said tapered surfaces of the outer ring, said land area having a cylindrical diameter corresponding to the smallest diameter of said tapered surfaces of the outer ring, said cylindrical land area forming a transverse step facing the medial part of the device between the groove and said at least one tapered surface of the outer ring, at least one of said paired tapered rings having a transverse end face confronting the medial part of the device, and retaining flange portions for engagement beyond said transverse steps of said inner and outer rings within said annular grooves, each of said retaining flange portions having a cylindrical surface extending from said transverse end face toward the tapered surface, said tapered ring having a cylindrical land area between each flange portion and the adjacent tapered surface, said cylindrical flange surface and land area being different in diameter so as to provide radial abutment surfaces on the tapered rings adapted to engage behind said steps, the cylindrical flange surfaces of said at least one tapered ring being of lesser axial length than the axial length of said annular grooves to enable said flanges of said tapered ring to seat within said annular grooves, the axial length of each of the land areas of said inner and outer elastically deformable rings being not greater than the axial length of said land areas of the tapered rings to enable said land areas to mate.

10. A fixing device according to claim 9 wherein said steps and said abutment surfaces comprise flat radial surfaces forming ninety degree angles with said cylindrical surfaces.

11. A fixing device according to claim 9 wherein the axial length of the land areas of the deformable rings are smaller than the axial length of the land areas of the tapered ring, providing a clearance between the abutment surfaces and the steps when said tapered surfaces of the deformable rings and the tapered ring mate.

12. A fixing device according to claim 9 wherein there are two land areas in the outer peripheral surface of said inner ring and two land areas in the inner peripheral surface of said outer ring, said land areas being beyond the opposite axial ends of the groove in the associated rings and forming transverse steps, each of said paired tapered rings having a transverse end face and two retaining flange portions to seat within said annular grooves beyond said transverse steps.

* * * * *